(12) United States Patent
Enrietti

(10) Patent No.: US 7,781,707 B2
(45) Date of Patent: *Aug. 24, 2010

(54) HEATED NOZZLE UNIT FOR THE MOULDING OF PLASTICS MATERIALS

(76) Inventor: Piero Enrietti, Via Roma 164, Donnas (Aosta) (IT) I-11020

( * ) Notice: Subject to any disclaimer, the term of this patent is extended or adjusted under 35 U.S.C. 154(b) by 929 days.

This patent is subject to a terminal disclaimer.

(21) Appl. No.: 11/578,829

(22) PCT Filed: Apr. 19, 2005

(86) PCT No.: PCT/EP2005/051719

§ 371 (c)(1),
(2), (4) Date: Oct. 18, 2006

(87) PCT Pub. No.: WO2005/102656

PCT Pub. Date: Nov. 3, 2005

(65) Prior Publication Data

US 2007/0241207 A1    Oct. 18, 2007

(30) Foreign Application Priority Data

Apr. 20, 2004  (IT) ................. TO2004A0240

(51) Int. Cl.
*H05B 3/58* (2006.01)
(52) U.S. Cl. .................. 219/535; 219/534; 219/536
(58) Field of Classification Search .......... 219/535, 219/534, 536, 285, 520
See application file for complete search history.

(56) References Cited

U.S. PATENT DOCUMENTS 4,035,613 A    7/1977  Sagawa et al.
6,222,165 B1   4/2001  Schwarzkopf
7,205,511 B2 * 4/2007  Enrietti .................. 219/535
2005/0181090 A1 * 8/2005  Olaru .................... 425/549

FOREIGN PATENT DOCUMENTS

| DE | 34 28 539 A1 | 2/1986 |
| DE | 200 15 016 U1 | 1/2001 |
| EP | 0 444 748 A1 | 9/1991 |
| EP | 0 590 621 A1 | 4/1994 |
| EP | 1 051 059 A2 | 11/2000 |
| EP | 1 395 085 A2 | 3/2004 |
| WO | WO 2004/067255 A1 | 8/2004 |

* cited by examiner

*Primary Examiner*—Tu B Hoang
*Assistant Examiner*—Vinod D Patel
(74) *Attorney, Agent, or Firm*—Merchant & Gould P.C.

(57) ABSTRACT

A nozzle has a tubular metal core which forms a central injection duct, and a cylindrical, outer, lateral surface. A heater/diffuser device includes a metal heat diffuser of tubular cylindrical shape with an open annular cross-section, mounted around the cylindrical surface of the core. The diffuser has: a cylindrical internal surface fitting the cylindrical surface of the nozzle core, two facing longitudinal free edges which are spaced apart circumferentially, are free of one another, and define between them a longitudinal space extending along a generator line of the cylindrical surface of the diffuser, and a recessed, channel-like seat formed in a surface of the diffuser element. A resistor is housed in the channel-like seat. The distance between the longitudinal free edges is such that, when the nozzle unit is heated by the supply of electrical current through the resistor, the diffuser is free to expand thermally by extending in the circumferential direction around the nozzle without moving radially away from the outer surface of the nozzle core.

10 Claims, 5 Drawing Sheets

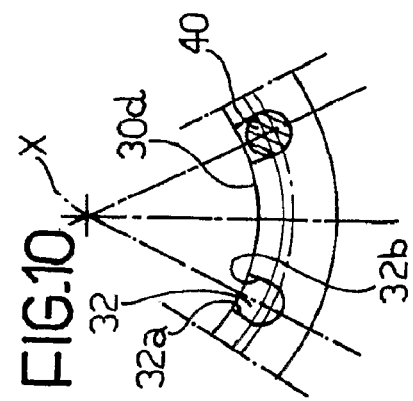
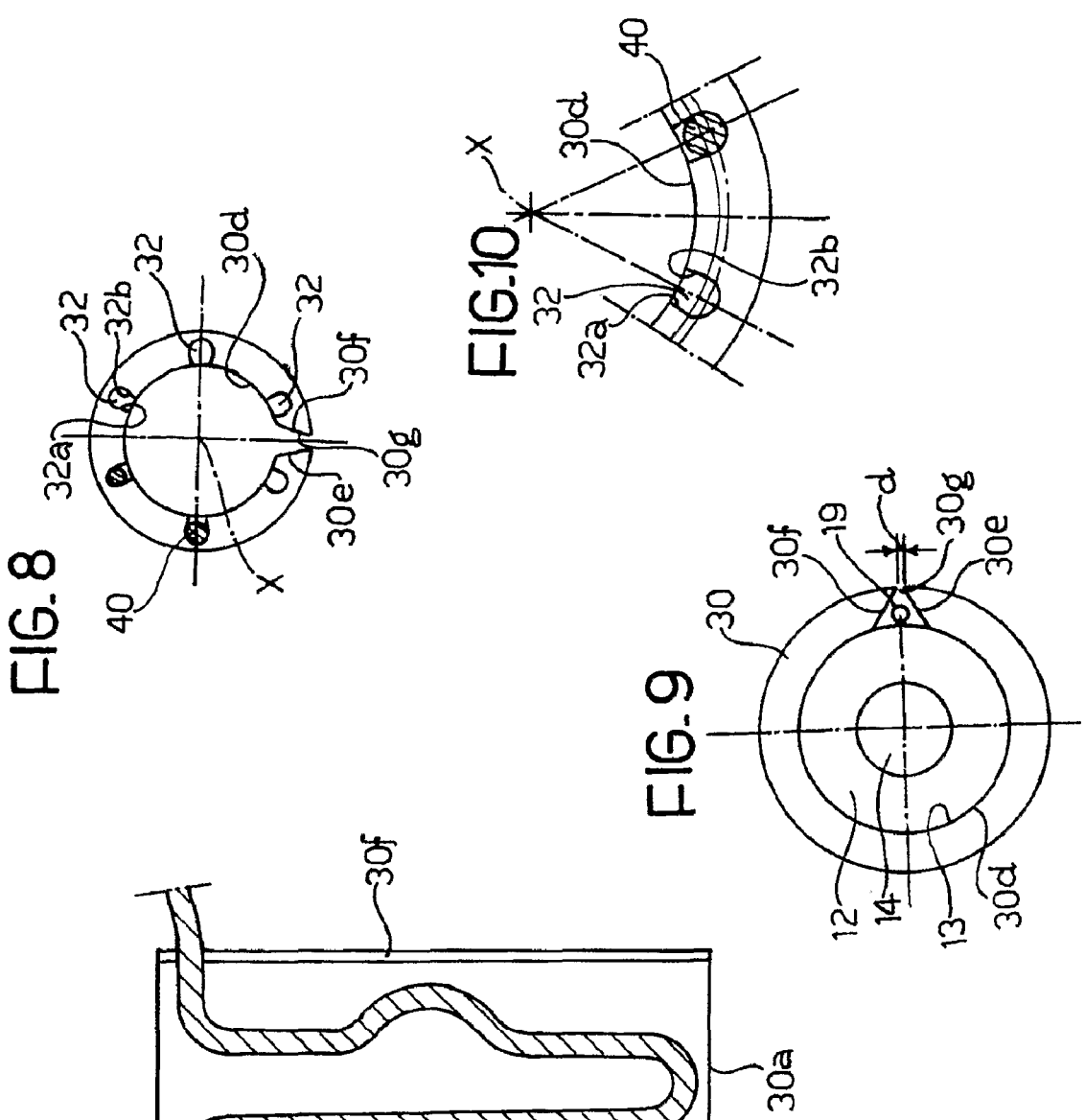
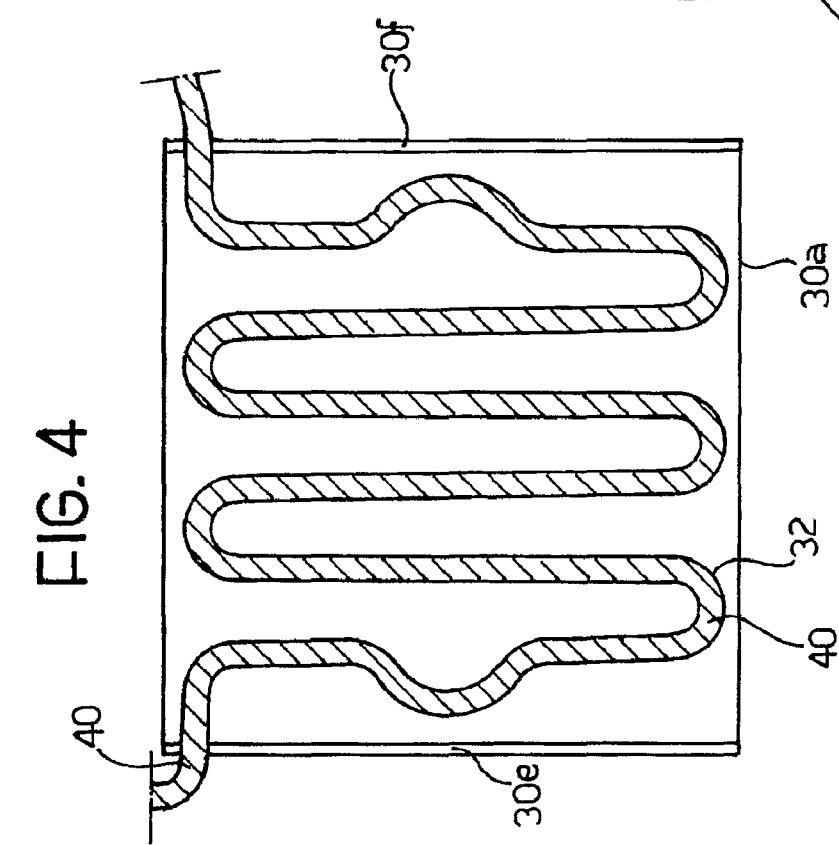

HEATED NOZZLE UNIT FOR THE MOULDING OF PLASTICS MATERIALS

BACKGROUND OF THE INVENTION

The present invention relates to a heated nozzle unit for the moulding of plastics materials.

Conventionally, an injection nozzle for the moulding of plastics materials comprises a cylindrical, tubular steel core which forms a central longitudinal injection duct for injecting the molten plastics material through one or more injection holes into a moulding cavity of a mould. An electrical resistor is wound as a helix around the tubular core to heat the plastics material which flows through the injection duct and to keep the parts of the nozzle which are affected by the flow of material at a controlled temperature such as to prevent the material from solidifying. The windings of the resistor are usually closer together in the region close to the injection hole, which is closer to the moulding cavity and therefore tends to cool more quickly than the central regions of the nozzle. A capillary thermocouple detects the temperature of the nozzle in the vicinity of the injection-hole. The heat supplied by the resistor tends to accumulate in the central region of the nozzle where higher temperatures are reached than in the region of the injection hole; at times, these higher temperatures are not permissible for the type of plastics material being processed which instead should be kept within a fairly limited temperature range to prevent degradation of the plastics material. Thus, the resistor is activated as soon as the thermocouple detects a temperature below a predetermined minimum value in the region of the injection hole but, even though the temperature of the injection duct in the central regions is acceptable, that temperature rises as a result of the switching-on of the resistor until it exceeds a maximum permissible value for the material.

In these known solutions, spiral resistors of rectangular cross-section are mostly used in order to increase the contact area between the resistor and the tubular nozzle core around which the resistor is wound. However, the contact area naturally constitutes only a fraction of the overall surface of the resistor so that most of the heat generated by the resistor is not actually transmitted to the nozzle but is dissipated into the surrounding mould and is thus lost. In fact the mould is in turn cooled in order to keep the walls of the moulding cavity at as low a temperature as possible in order to speed up the solidification of the molten material and thus shorten the moulding cycles.

In order to dissipate the heat from the central portion of the nozzle and to distribute the heat more uniformly along the injection duct, it has been proposed to incorporate the resistor in a tubular metal diffuser element which is fitted externally on the tubular nozzle core. According to this solution, a channel-like seat is formed in the outer surface of a cylindrical tubular element and the resistor is inserted therein. However, here again, excessive heat dispersal occurs from the outer surface of the resistor towards the surrounding mould; moreover, direct contact (and hence direct transmission of the heat by conduction) is not achieved between the resistor and the tubular nozzle core.

SUMMARY OF THE INVENTION

The object of the present invention is therefore to provide an improved heated nozzle unit, addressing principally the problems of:

heating the injection duct of a nozzle uniformly within a predetermined and limited temperature range;

preventing accumulation of heat and hence excessively high temperatures in the central portions of the nozzle, and optimizing the consumption of electrical energy for the supply of the resistors as well as reducing the amount of heat dissipated thereby towards the mould in which the nozzles are mounted.

These and other objects and advantages, which will be understood further from the following description, are achieved by a heated nozzle unit having the characteristics defined in the appended claims.

BRIEF DESCRIPTION OF THE DRAWINGS

The characteristics and the advantages of the invention will become clear from the detailed description of an embodiment thereof which is given with reference to the appended drawings which are provided by way of non-limiting example and in which:

FIG. 4 is a plan view of the plate of FIG. 2 on which a resistor is fitted, FIG. 8 is a cross-section through the heater/diffuser device, FIG. 9 is an enlarged view of a detail of FIG. 8, FIG. 10 is a cross-section taken on the line X-X of FIG. 1, and FIGS. 11 and 12 are two plan views similar to FIG. 2 of two further embodiments of the heat-diffuser according to the invention.

DETAILED DESCRIPTION OF THE PREFERRED EMBODIMENT(S)

Figure 1:
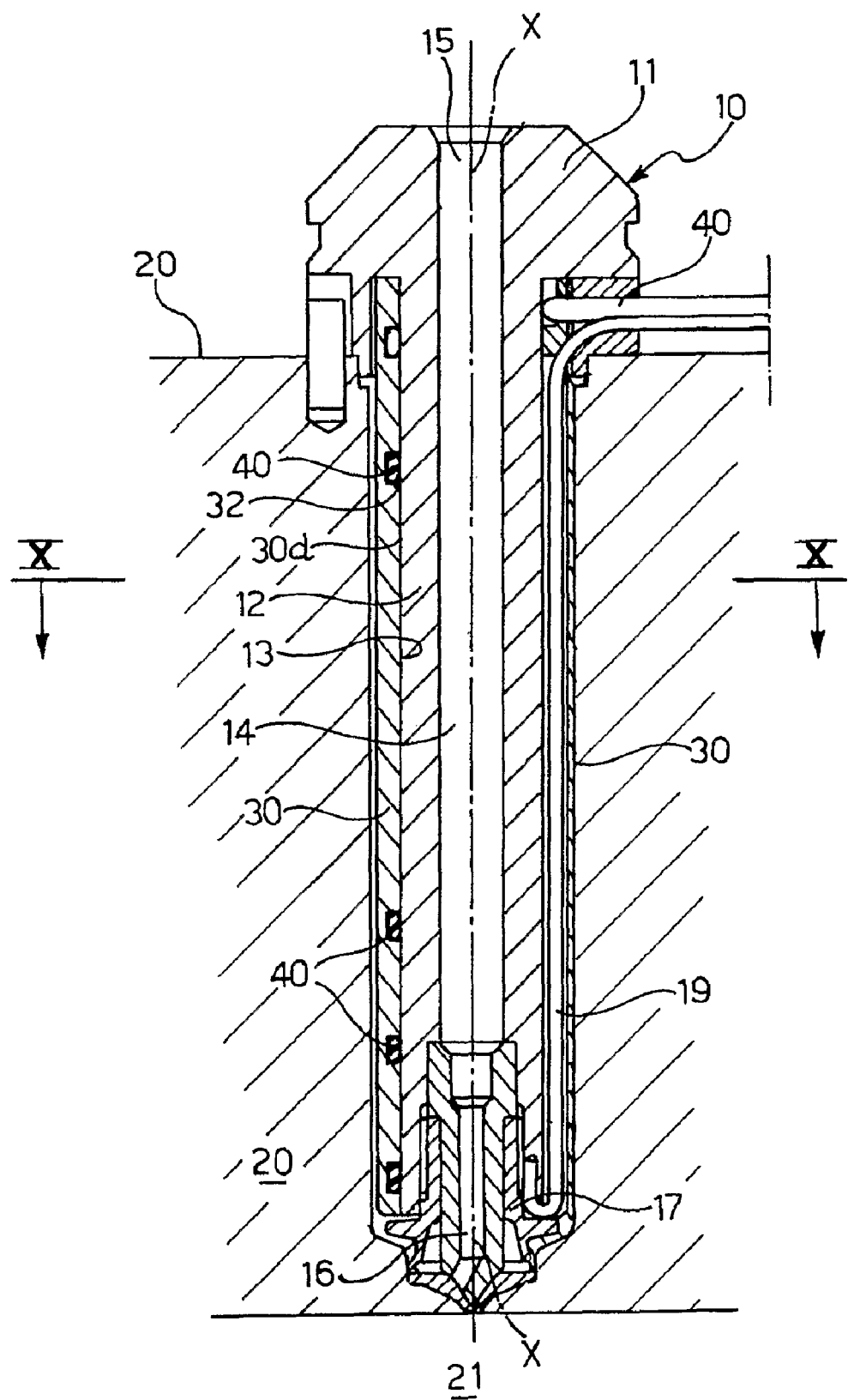
FIG. 1 is a cross-section through a heated nozzle unit according to the invention, comprising a nozzle and a heater/heat-diffuser device.

With reference now to FIG. 1, an injection nozzle generally indicated 10 for the moulding of plastics material is mounted in a mould 20 with a moulding cavity 21.

The nozzle 10 comprises a steel body 11 which is formed integrally with a cylindrical tubular core 12 with an outer lateral surface 13.

The tubular core 12 has a central longitudinal injection duct 14 which extends between an upper region 15 for the input of the molten material as far as a lower region 16 in which a conventional tip 17 which forms the end portion of the injection duct 14 is inserted. A capillary thermocouple indicated 19 extends as far as the vicinity of the lower region 16 of the injection duct 14 in order to detect the temperature in the vicinity of the region in which the plastics material is injected in the molten state into the moulding cavity.

A tubular cylindrical diffuser 30 is mounted on the lateral surface 13 of the core 12; the diffuser 30 has an open annular cross-section defining a central cavity fitting the lateral surface 13 of the core. For reasons which will be explained below, as shown in FIGS. 8 and 10, the diffuser 30 has facing and spaced apart free longitudinal edges 30e, 30f which define between them a longitudinal space 30g extending along a generator of the cylindrical surface of the diffuser 30.

The diffuser 30 is made of a metal or a metal alloy having high thermal conductivity, for example, brass, copper, or aluminium and, when mounted on a nozzle as shown in FIG. 1, extends substantially along the entire length of the steel core 12.

The diffuser 30 has, on its internal cylindrical surface 30*d*, a recessed channel-like seat 32 which houses an electrical resistor 40 for heating the core 12 directly. The channel 32 follows a path which extends around the lateral surface of the core in a manner such that the resistor 40 transmits heat to the core 12 uniformly, cooperating with the diffuser 30. By virtue of its high thermal conductivity, the diffuser 30 also ensures that a substantially uniform temperature is maintained along the core 12 and prevents heat accumulating and excessively high temperatures arising in the central regions of the nozzle.

A method for the manufacture of the heater/diffuser device 30 and for its mounting on the nozzle 10 is as follows.

Figure 2:
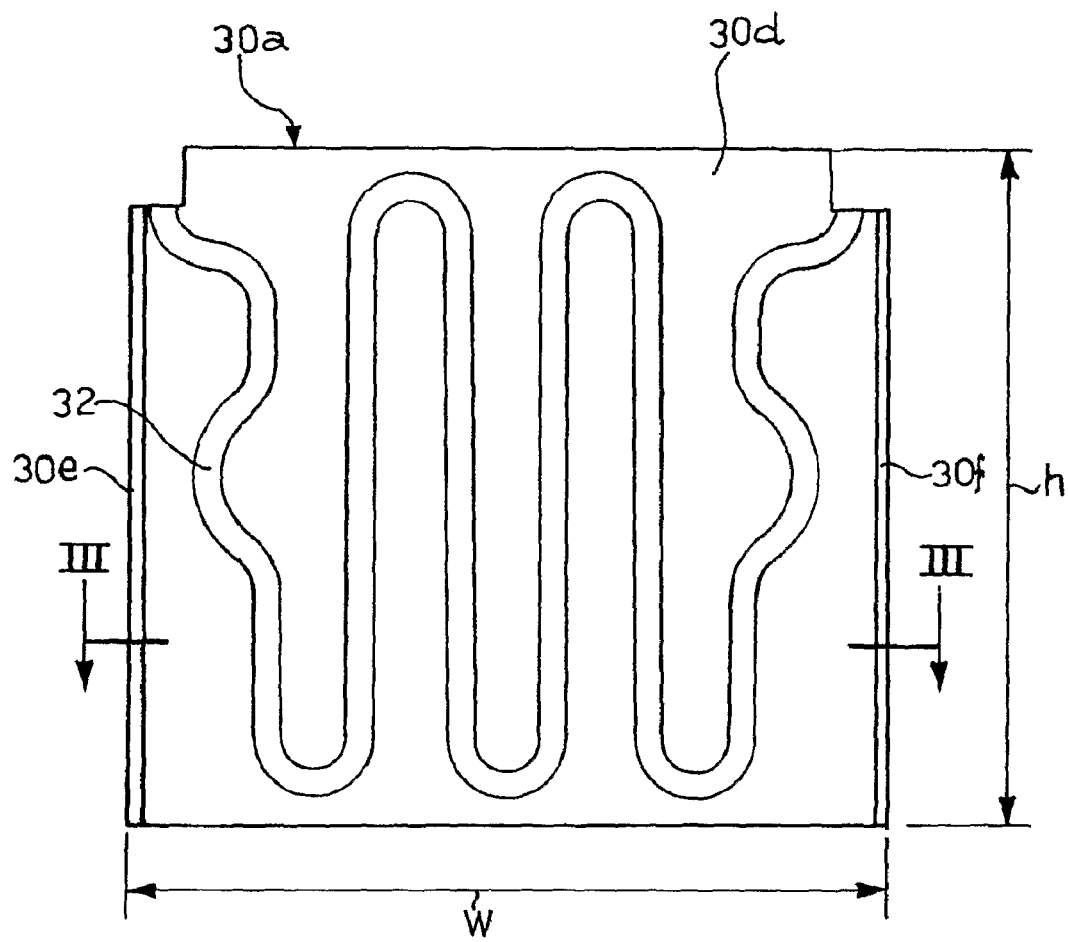
FIGS. 2 and 3 are a plan view and a cross-section taken on the line III-III, respectively, of a plate-like semi-finished product for the formation of a heater/diffuser device of the type shown in FIG. 1.
Figure 3:
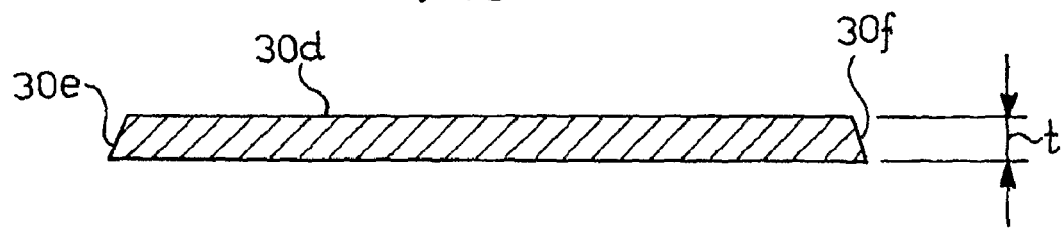

Starting with a flat metal sheet, a substantially rectangular flat plate such as that indicated 30*a* in FIGS. 2 and 3 is produced. The plate 30*a* has a height h corresponding to the length of the nozzle core 12 on which the diffuser is fitted and a width w slightly less than the circumference of the cylindrical surface 13 of the core. The thickness t of the plate is selected such that the channel 32 which is subsequently formed in one of the two faces of the plate is suitable for accommodating a wire resistor 40 the diameter of which is preselected in dependence on the desired electrical characteristics. For example, a plate thickness of about 2 mm may be used to house a 1 mm diameter wire. In the preferred embodiment shown in the drawings, the two opposed longitudinal edges 30*e*, 30*f* of the plate 30*a* are inclined along planes which converge towards a face 30*d* of the plate which will face towards the interior of the nozzle in use.

The internal face 30*d* of the plate 30*a* is then processed, for example, by milling, electrical-discharge machining, or other known processes to form a channel 32 having a substantially C-shaped or U-shaped cross-section such as to accommodate a resistor 40 exactly, or with a predetermined clearance. Alternatively, the step of the formation of the channels 32 may be performed on the starting sheet before it is cut into a number of plates corresponding to the number of channels.

The resistor 40 is then fitted in the channel 32 (FIG. 4). To ensure direct contact with the surface of the nozzle core in the mounted condition, the surface of the resistor is level with the face 30*d* having the channel 32 or projects slightly beyond that face.

Figure 5:
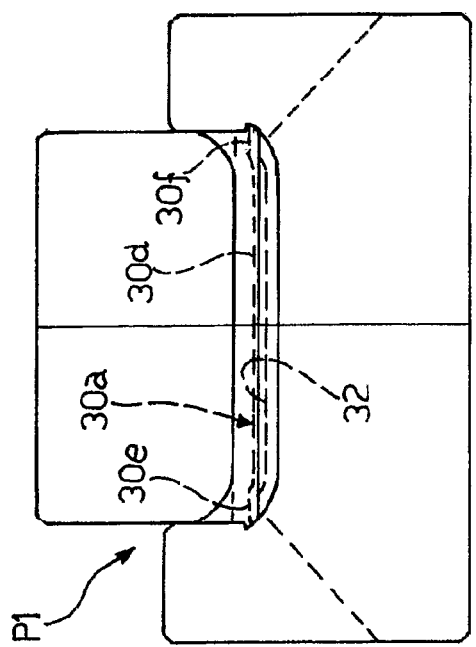

The plate 30*a* with the resistor fitted is then placed in a first bending tool P1 (FIG. 5) in which the two opposed longitudinal edges 30*e*, 30*f* of the plate are bent in the direction in which the face 30*d* faces. The plate is then placed in a second bending tool P2 (FIG. 6) in which a C-shape or a U-shape is imparted to the plate. Finally, in a third bending tool P3 (FIG. 7), the body 30 is given its final open tubular cylindrical shape with a central longitudinal axis x parallel to the opposed edges 30*e*, 30*f*.

A cylindrical forming tool P4 is used during this bending step and is placed in contact with the internal surface 30*d*. The tool P4 has a diameter slightly smaller than that of the cylindrical surface 13 of the nozzle core 12 on which the diffuser is to be fitted.

Figure 6:
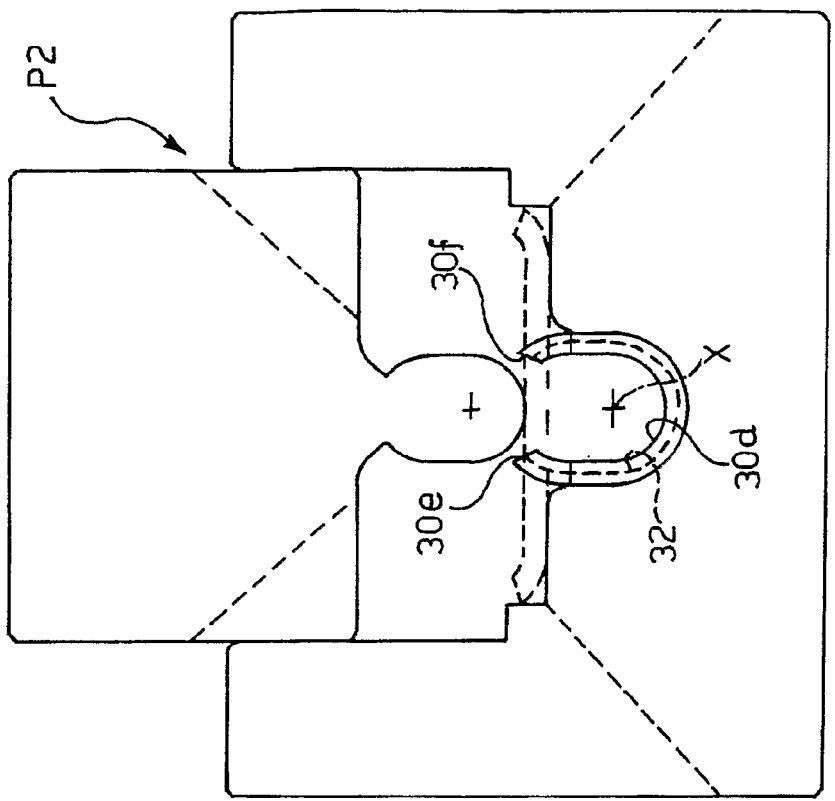
FIGS. 5 to 7 are views showing schematically three separate bending steps for the formation of the heater/diffuser device.
Figure 7:
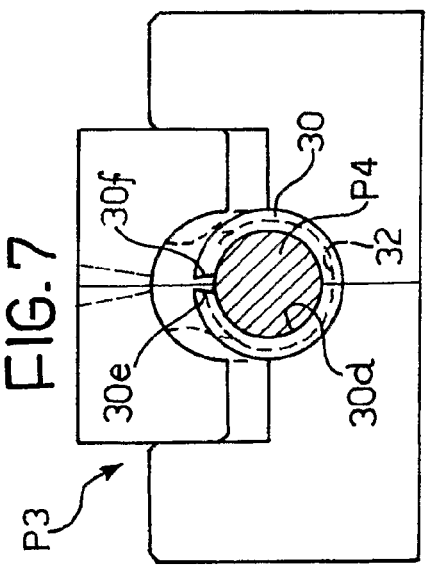

During the bending steps shown in FIGS. 6 and 7, the bending of the diffuser 30 advantageously also causes a slight convergence of the facing surfaces 32*a*, 32*b* of the channel 32, at least in the portions in which the channel 32 extends parallel to the longitudinal axis of the diffuser. The convergence of the facing surfaces 32*a*, 32*b* towards the centre of the diffuser (FIGS. 8 and 9) has the effect of gripping the resistor 40 in the channel 32. Naturally, in this case, the shapes and sizes of the channel 32 and of the resistor 40 will have to be selected precisely to achieve this clamping effect.

As indicated schematically in FIG. 10, the capillary thermocouple 19 is housed and restrained firmly in the space defined between the two edges 30*e* and 30*f* and the outer surface 13 of the tubular core 12. The thermocouple 19 has a diameter greater than the maximum distance between the free edges 30*e* and 30*f*. This maximum distance is that which is present when the nozzle is cold.

It is important to point out that, when the diffuser 30 with the incorporated resistor 40 is mounted on the nozzle in a "cold" condition, the longitudinal edges 30*e* and 30*f* are spaced apart circumferentially by a predetermined distance "d", for example, of about 0.5 mm. By virtue of this arrangement, when the nozzle is heated by the supply of electrical current through the resistor 40, the diffuser 30 is free to expand thermally by extending in the circumferential direction around the nozzle and does not tend to expand radially and hence to move away from the outer surface 13 of the nozzle, as would happen if the diffuser were a tubular element with a closed annular cross-section or if the edges 30*e* and 30*f* were restrained rigidly relative to one another. According to the invention, therefore, the diameter of the internal face 30*d* of the diffuser remains substantially unchanged during the cooling and heating cycles. This ensures that the resistor 40 is always in direct contact with the surface 13 of the nozzle core 12. It should also be noted that, during the heating stage, the steel core 12 (which has a closed annular cross-section) also expands radially and this radial expansion of the nozzle therefore promotes improved contact with the resistor 40 in spite of the fact that the steel of which the nozzle is made has a lower thermal expansion coefficient than the brass of which the diffuser 30 is preferably made.

In the condition of maximum heating, the opposed edges 30*e* and 30*f* may still be slightly spaced apart or may be in contact with one another but without this leading to radial expansion of the diffuser and hence appreciable movement of the face 30*d* of the diffuser, and hence of the resistor 40, away from the outer surface 13 of the nozzle.

As mentioned above, during the step of the bending of the plate 30*a*, a tool P4 of slightly smaller diameter than the cylindrical surface 13 of the nozzle core 12 is preferably used. Once bent to its final curved shape, the internal face 30*d* of the diffuser thus has a diameter which, in the free or undeformed condition, is slightly smaller than the outside diameter of the core 12. The diffuser 30 can thus be mounted on the core 12 with slight radial interference by resilient opening-out of the diffuser by means of a suitable tool (not shown) in order to fit the diffuser onto the nozzle core. By virtue of this interference fit, the diffuser is clamped resiliently on the nozzle and further ensures continuous contact between the nozzle and the resistor.

As will be appreciated, in contrast with the conventional diffusers discussed in the introductory portion of the description, according to the present invention, the resistor 40 is in direct and continuous contact with the nozzle core 12, apart from the difference in the thermal expansion coefficients of the materials of which the diffuser and the nozzle core are made. The homogeneous distribution of the resistor around the internal cylindrical surface of the diffuser ensures uniform transmission of heat to the injection duct, particularly in its region closest to the injection hole. In addition, since the resistor 40 contacts the cylindrical wall 13 of the nozzle core directly, it is possible to reach and maintain the prescribed temperature in the injection channel with a lower consumption of electrical current. The portion of the surface of the resistor 40 which is in contact with the wall of the channel 32 transmits heat to the diffuser 30 rather than dispersing it into the mould. Experimental tests carried out by the Applicant have shown that the invention permits a saving of electrical energy of 60% or more.

Figure 11:
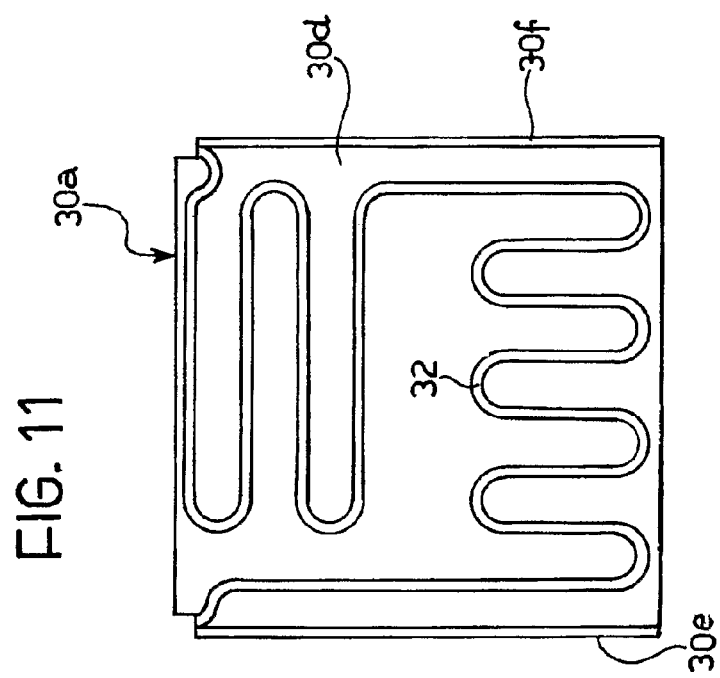
Figure 12:
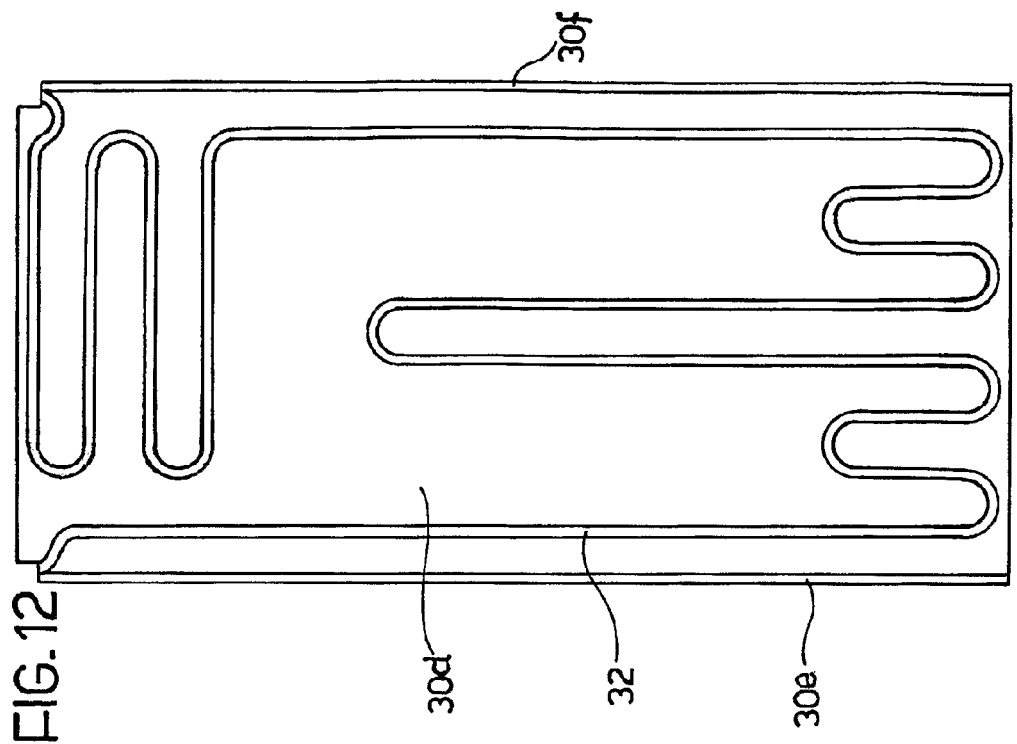

The invention is not intended to be limited to the embodiments described and illustrated herein, which should be considered as examples of the construction of the nozzle unit. Rather, the invention may be modified with regard to the shape and arrangement of parts and constructional and operational details. For example, as shown in FIGS. 11 and 12, the path followed by the channel 32 along the internal surface of the diffuser may vary in dependence on the type of nozzle, on the dimensions thereof, and on operating requirements. FIGS. 11 and 12 show two examples in which the channel 32 (and therefore the resistor 40) is distributed more densely in the upper and lower end regions of the diffuser and less densely in the central region to prevent accumulation of heat in that region.

The invention claimed is:

1. An injection nozzle unit for the moulding of plastics materials, comprising:
    a nozzle with a tubular metal core forming a central longitudinal injection duct and a substantially cylindrical, outer, lateral surface, and
    a heater/diffuser device comprising:
    a metal heat diffuser element of tubular cylindrical shape with an open annular cross-section, mounted around the cylindrical outer surface of the nozzle core, with a substantially cylindrical internal surface fitting the cylindrical outer surface of the nozzle core, with two facing longitudinal free edges which are spaced apart circumferentially, are free of one another, and define between them a longitudinal space extending along the cylindrical surface of the heat diffuser element, and with a recessed, channel-like seat formed in said internal surface of the heat diffuser element that is in contact with the cylindrical outer surface of the nozzle core, and
    a wire resistor housed in the channel-like seat,
    wherein said metal heat diffuser element of tubular cylindrical shape comprises one bent metal plate, so that said longitudinal space along the cylindrical surface of said heat diffuser element is defined by two opposed ends of said one bent metal plate;
    wherein said wire resistor is housed is said channel-like seat with said metal plate being initially unbent;
    wherein the heat diffuser element has an internal diameter smaller than that of the cylindrical outer surface of the nozzle core, wherein the metal heat diffuser element is mounted on the outer surface of the nozzle core with radial interference for gripping the nozzle core resiliently, and
    wherein when the injection nozzle unit is heated by the supply of electric current through the wire resistor, the distance between the longitudinal free edges of the heat diffuser element provides for the heat diffuser element being substantially free to expand thermally by extending in the circumferential direction around the nozzle core without moving radially away from the outer surface of the nozzle core.

2. A nozzle unit according to claim 1, wherein the two opposed facing longitudinal free edges of the heat diffuser element are inclined along planes parallel to a central longitudinal axis of the central nozzle, converging towards the outside of the nozzle, so that said facing longitudinal free edges define, with the outer surface of the nozzle core, a space for housing a capillary thermocouple having a thickness or diameter greater than the maximum distance between the free edges when the nozzle is cold.

3. A nozzle unit according to claim 1, wherein the wire resistor housed in the channel-like seat is arranged substantially level with or in contact with the outer surface of the nozzle core in order to transmit heat directly thereto.

4. A nozzle unit according to claim 1, wherein the channel-like seat has, prior to said metal plate being bent, a substantially C-shaped or U-shaped cross-section in order to accommodate the wire resistor exactly, with a predetermined minimum clearance, or with slight interference.

5. A nozzle unit according to claim 4, wherein the channel-like seat has facing surfaces which, as effect of the bending of said metal plate into said cylindrical shape, converge slightly towards the centre of the heat diffuser to restrain the wire resistor in the channel-like seat.

6. A nozzle unit according to claim 1, wherein the channel-like seat is formed on a face of said one metal plate by milling or an electrical-discharge machining process.

7. A nozzle unit according to claim 1, wherein the channel-like seat and the wire resistor housed therein are distributed more densely in the upper and lower regions and less densely in the central region of the heat diffuser element.

8. A nozzle unit according to claim 1, wherein the metal heat diffuser element is made of a material selected from a group consisting of brass, copper and aluminium.

9. A nozzle unit according to claim 1, wherein said nozzle core is made of steel.

10. A nozzle unit according to claim 1, wherein said one metal plate, provided for being bent, has a substantially rectangular shape.

* * * * *